(12) United States Patent
Itoh et al.

(10) Patent No.: US 11,603,133 B2
(45) Date of Patent: Mar. 14, 2023

(54) STEERING APPARATUS

(71) Applicant: HONDA MOTOR CO., LTD., Tokyo (JP)

(72) Inventors: Jun Itoh, Saitama (JP); Yoshinori Masubuchi, Saitama (JP); Yutaka Hayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/379,510

(22) Filed: Jul. 19, 2021

(65) Prior Publication Data

US 2022/0055690 A1 Feb. 24, 2022

(30) Foreign Application Priority Data

Aug. 19, 2020 (JP) .............................. JP2020-138911

(51) Int. Cl.
  *B62D 5/04* (2006.01)
  *B62D 17/00* (2006.01)
(52) U.S. Cl.
  CPC ........... *B62D 17/00* (2013.01); *B62D 5/0409* (2013.01)
(58) Field of Classification Search
  CPC .......... B62D 5/04; B62D 5/0418; B62D 7/20; B62D 5/0409; B62D 17/00
  See application file for complete search history.

(56) References Cited

U.S. PATENT DOCUMENTS

| | | | |
|---|---|---|---|
| 8,701,801 B2 | 4/2014 | Itou et al. | |
| 10,384,531 B2 * | 8/2019 | Yang | B60B 33/0018 |
| 2007/0095594 A1 * | 5/2007 | Prehn | B66F 9/07568 |
| | | | 180/254 |
| 2017/0349042 A1 * | 12/2017 | Yang | B62D 7/026 |
| 2018/0099555 A1 * | 4/2018 | Yang | B62D 7/026 |
| 2021/0008939 A1 * | 1/2021 | Schmidt | B62D 7/146 |
| 2021/0170787 A1 * | 6/2021 | Wharram | B60B 35/1009 |
| 2021/0229745 A1 * | 7/2021 | Rogers | B60G 7/006 |

(Continued)

FOREIGN PATENT DOCUMENTS

| | | | |
|---|---|---|---|
| CN | 106428198 A | * | 2/2017 |
| CN | 107284520 A | | 10/2017 |
| FR | 2982832 A1 | | 5/2013 |

(Continued)

OTHER PUBLICATIONS

FR2982832A1 machine translation from espacenet.com Aug. 2022.*

(Continued)

*Primary Examiner* — Paul N Dickson
*Assistant Examiner* — Maxwell L Meshaka
(74) *Attorney, Agent, or Firm* — Carrier Shende & Associates, P.C.; Fuschland P. Shende; Joseph P. Carrier

(57) ABSTRACT

Provided is a steering apparatus 1 including: a wheel 2; and a steering unit 5 configured to steer the wheel 2, the steering apparatus 1 being fixable to a vehicle body, wherein the steering unit 5 includes: a steering drive source (an electric motor incorporated in an electric motor unit 61) configured to steer the wheel 2 with a steering rotation axis 63a as an axis, the steering rotation axis 63a being a rotation axis when the wheel 2 is steered; and a manual toe angle adjustment mechanism 7 different from the steering drive source, the manual toe angle adjustment mechanism 7 enabling a toe angle of the wheel 2 to be manually adjusted around the steering rotation axis 63a.

3 Claims, 5 Drawing Sheets

(56) References Cited

U.S. PATENT DOCUMENTS

2021/0316783 A1* 10/2021 Lawson, Jr. ............. B62D 7/06
2021/0323604 A1* 10/2021 Combs ................. B62D 5/0403

FOREIGN PATENT DOCUMENTS

| JP | H05-139334 A | 6/1993 |
| JP | 2012-017093 A | 1/2012 |
| WO | WO-2021210892 A1 * | 10/2021 |

OTHER PUBLICATIONS

Office Action dated Mar. 11, 2022 issued in the corresponding German Patent Application No. 10 2021 120 244.2 with the English translation thereof.

* cited by examiner

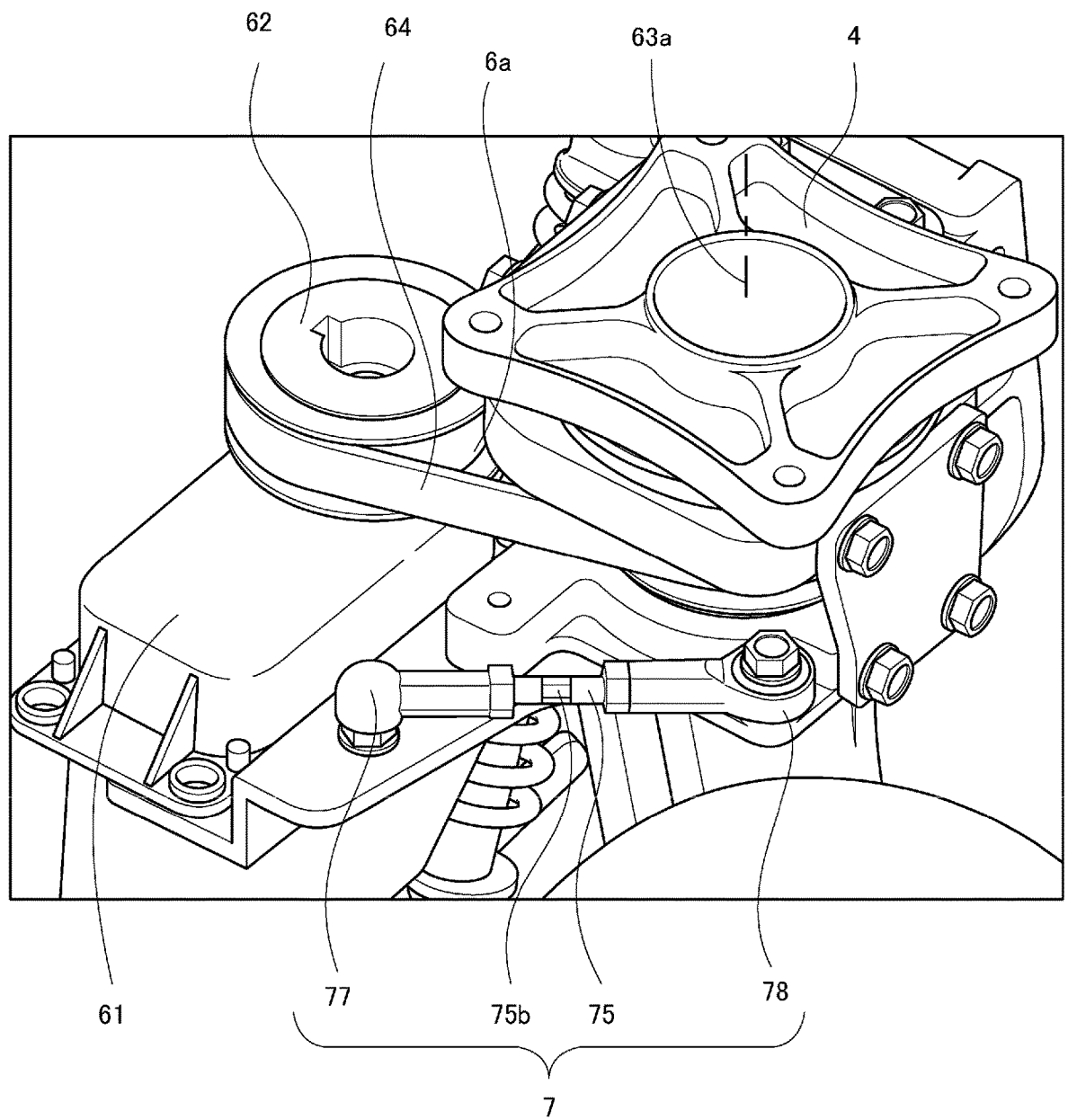

STEERING APPARATUS

BACKGROUND

Technical Field

The present invention relates to a steering apparatus including a wheel and a steering unit configured to steer the wheel.

Related Art

Conventionally, an electric vehicle including an in-wheel motor driving apparatus and an independent steering apparatus configured of a steering-by-wire system are known (See, for example, Japanese Patent Application Laid-Open No. 2012-017093).

SUMMARY

It is also conceivable to form a moving body by assembling a steering apparatus including a wheel to a frame of a vehicle body. This steering apparatus can be configured such that the wheel is steered by an electric motor via a belt and a pulley. In this steering apparatus configured to steer the wheel by the electric motor, it is necessary to adjust a toe angle in order to secure straightness after the steering apparatus is assembled to the vehicle body. However, adjustment requires fine adjustment of a zero position of the electric motor or fine adjustment by loosening a mounting point of an electric motor unit in which the electric motor is contained, so that there is a concern that it takes time and labor.

In view of the above point, an object of the present invention is to provide a steering apparatus configured to enable a toe angle to be easily adjusted.

[1] In order to achieve the above object, a steering apparatus of the present invention (for example, a steering apparatus 1 of an embodiment, which will be applied to description below) is a steering apparatus including:
a wheel (for example, a wheel 2 of the embodiment, which will be applied to description below); and a steering unit (for example, a steering unit 5 of the embodiment, which will be applied to description below) configured to steer the wheel, the steering apparatus being fixable to a vehicle body, wherein
the steering unit includes:
a steering drive source (for example, an electric motor incorporated in an electric motor unit 61 of the embodiment, which will be applied to description below) configured to steer the wheel with a steering rotation axis (for example, a steering rotation axis 63a of the embodiment, which will be applied to description below) as a rotation axis, the steering rotation axis being a rotation axis when the wheel is steered; and
a manual toe angle adjustment mechanism (for example, a manual toe angle adjustment mechanism 7 of the embodiment, which will be applied to description below) different from the steering drive source, the manual toe angle adjustment mechanism enabling a toe angle of the wheel to be manually adjusted around the steering rotation axis.

According to the present invention, it is not necessary to perform fine adjustment of a zero position of the electric motor or fine adjustment by loosening a mounting point of the electric motor unit in which the electric motor is incorporated, and a toe angle can be easily adjusted manually with the manual toe angle adjustment mechanism.

[2] Further, in the present invention, it is preferable that the steering apparatus includes:
a vehicle body mounting portion (for example, a vehicle body mounting portion 4 of the embodiment, which will be applied to description below) fixed to the vehicle body; and
a wheel support portion (for example, a wheel support body 3 of the embodiment, which will be applied to description below) configured to rotatably support the wheel, wherein
the steering unit is rotatable with respect to the vehicle body mounting portion, and connects the vehicle body mounting portion and the wheel support portion so as to rotate integrally with the wheel support portion,
the manual toe angle adjustment mechanism includes:
a fixed portion (for example, a first node portion 73 of the embodiment, which will be applied to description below) provided on the steering unit so as to be rotatable around an axis parallel to the steering rotation axis;
a movable portion (for example, a second node portion 74 of the embodiment, which will be applied to description below) provided on the wheel support portion so as to be rotatable around an axis parallel to the steering rotation axis; and
an adjustment portion (for example, an adjustment screw 75 of the embodiment, which will be applied to description below) configured to connect the fixed portion and the movable portion such that a distance between the fixed portion and the movable portion is adjustable, and
the adjustment portion enables the distance between the fixed portion and the movable portion to be adjusted, and enables the toe angle of the wheel to be adjusted by adjusting the distance.

According to the present invention, it is not necessary to perform fine adjustment of the zero position of the electric motor or fine adjustment by loosening the mounting point of the electric motor unit in which the, and the toe angle can be easily adjusted manually with the manual toe angle adjustment mechanism.

[3] Further, in the present invention, it is preferable that the electric motor is disposed at a position eccentric to a steering rotating shaft (for example, a steering rotating shaft 4a of the embodiment, which will be applied to description below) centering on the steering rotation axis,
the adjustment portion is provided with an operation portion (for example, a hexagonal hole 75a, a spanner fitting portion 75b) configured to operate the adjustment portion, and
the operation portion is disposed outside an existing region (for example, an existing region 6a of the embodiment) where a power transmission mechanism (for example, pulleys 62, 63, a belt 64, a gear train of the embodiment, which will be applied to description below) between the electric motor and the steering rotating shaft exists.

According to the present invention, since the operation portion is disposed outside the existing region, the power transmission mechanism is not an obstacle, so that the adjustment portion can be easily operated.

[4] Further, in the present invention, it is preferable that any one of the fixed portion and the movable portion is disposed so as to be included in the existing region, another one of the fixed portion and the movable portion is disposed outside the existing region, and the operation portion is provided on a side of the other one of the fixed portion and the movable portion.

According to the present invention, since any one of the fixed portion and the movable portion is disposed in the existing region between the electric motor and the steering rotating shaft, a dead space between the electric motor and the steering rotation axis can be effectively used, and the steering apparatus can be downsized.

In addition, since the operation portion configured to operate the adjustment portion is disposed on the side of the other one of the fixed portion and the movable portion, which is disposed outside the existing region, the power transmission mechanism is not an obstacle, so that the adjustment portion can be easily operated.

BRIEF DESCRIPTION OF DRAWINGS

FIG. 5 is an enlarged explanatory view showing a toe angle adjustment mechanism of a steering apparatus according to another embodiment of the present invention.

DETAILED DESCRIPTION

Figure 1:
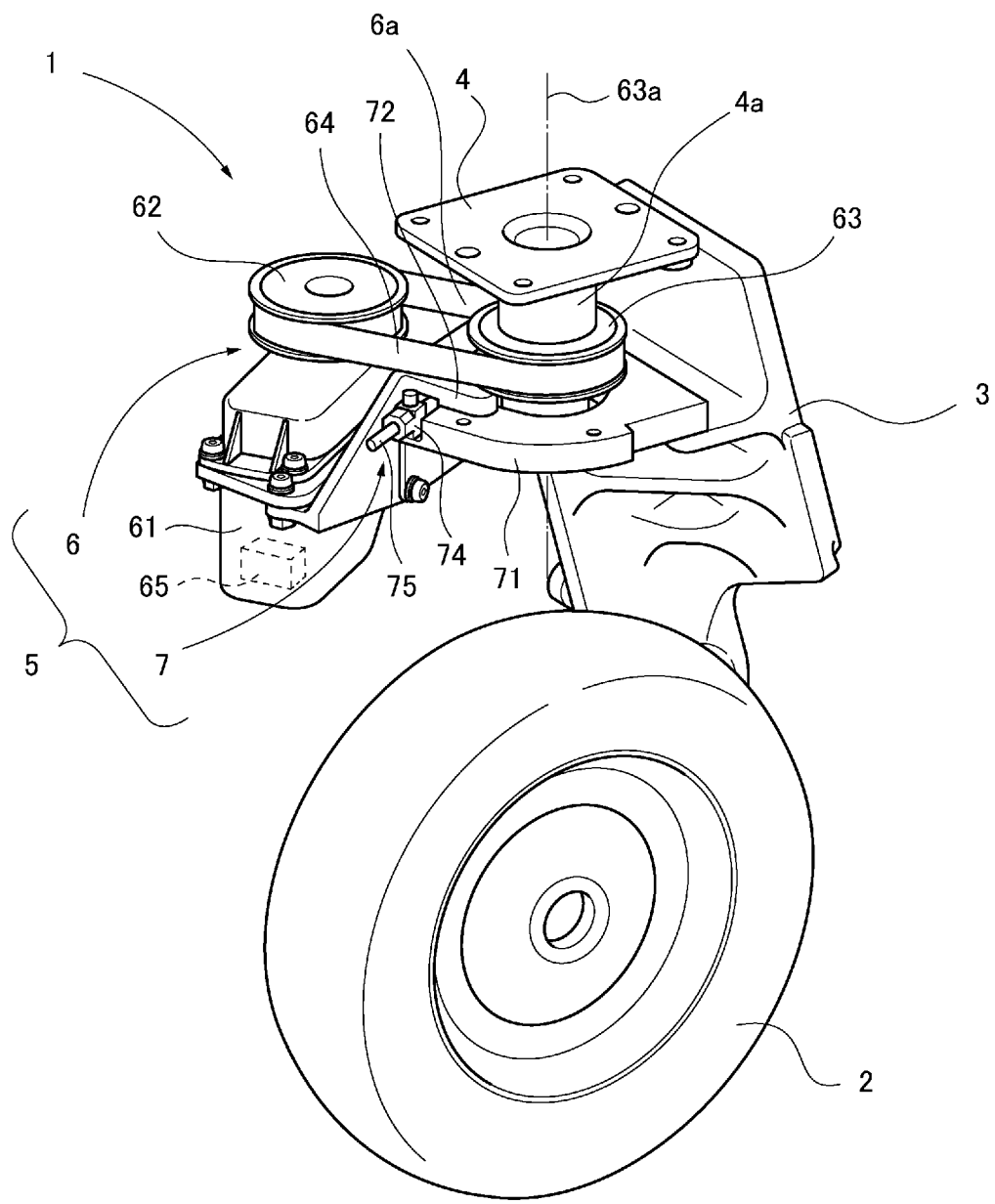
FIG. 1 is a perspective view showing a steering apparatus according to an embodiment of the present invention.

A steering apparatus according to an embodiment of the present invention will be described with reference to the drawings. Referring to FIG. 1, a steering apparatus 1 of the present embodiment includes a wheel 2, a wheel support body 3 as a wheel support portion configured to rotatably support the wheel 2, a vehicle body mounting portion 4 that can be fixed to a vehicle body (not shown), a steering main body mechanism 6 that is fixed to the vehicle body mounting portion 4 and turns the wheel support body 3 with respect to the vehicle body mounting portion 4 to steer the wheel 2, and a manual toe angle adjustment mechanism 7 different from the steering main body mechanism 6. As the vehicle body (not shown), for example, a bogie, an automobile, a robot, and the like can be cited, and it is conceivable to mount a plurality of the steering apparatuses 1 of the present embodiment on the vehicle body, and cause a wheel to travel.

The steering main body mechanism 6 includes an electric motor unit 61 provided in the vehicle body mounting portion 4 and incorporating an electric motor as a steering drive source, a driving pulley 62 rotated by the electric motor unit 61 and having a rotation axis parallel to a steering rotation axis 63a, a driven pulley 63 provided integrally with the vehicle body mounting portion 4 such that the steering rotation axis 63a is at a center, a belt 64 wound around the driving pulley 62 and the driven pulley 63, and a control portion 65 configured to control the electric motor unit 61. The vehicle body mounting portion 4 includes a steering rotating shaft 4a serving as a shaft of the driven pulley 63.

The steering main body mechanism 6 rotates the electric motor unit 61 by the control portion 65 on the basis of an instruction signal, and the rotation of the electric motor unit 61 is transmitted to the vehicle body mounting portion 4 via the driving pulley 62, the belt 64, and the driven pulley 63, by which the wheel support body 3 rotates together with the electric motor unit 61 around the steering rotation axis 63a with respect to the vehicle body mounting portion 4, and the wheel 2 is steered. In the present embodiment, a central axis of the driven pulley 63 corresponds to the steering rotation axis 63a, the pulleys 62, 63 and the belt 64 correspond to a power transmission mechanism, and an inside of the belt 64 and an inside of a projection space obtained by projecting the belt 64 in a vertical direction are an existing region 6a.

Figure 2:
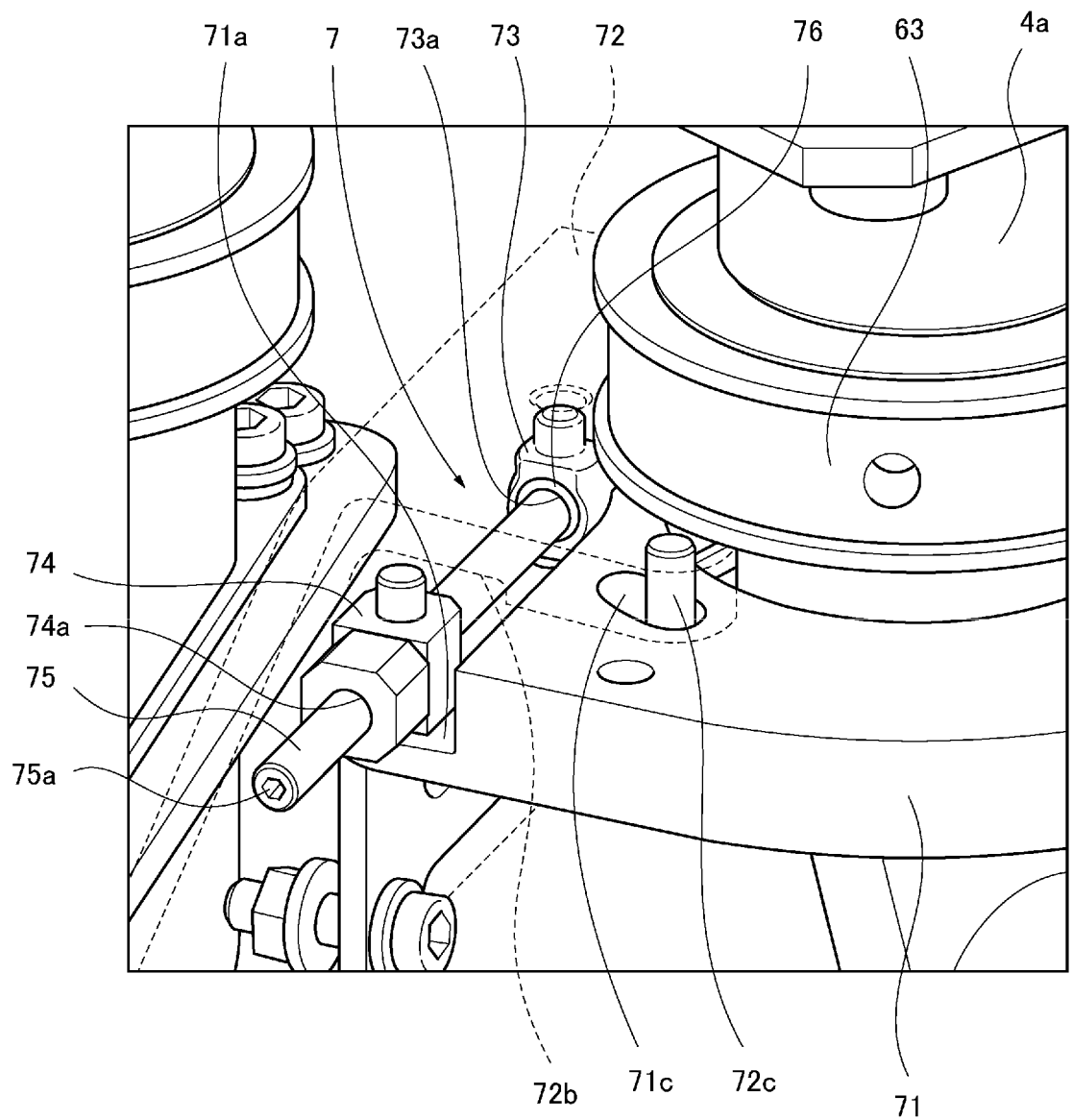
FIG. 2 is an enlarged perspective view showing a manual toe angle adjustment mechanism of the present embodiment.
Figure 3:
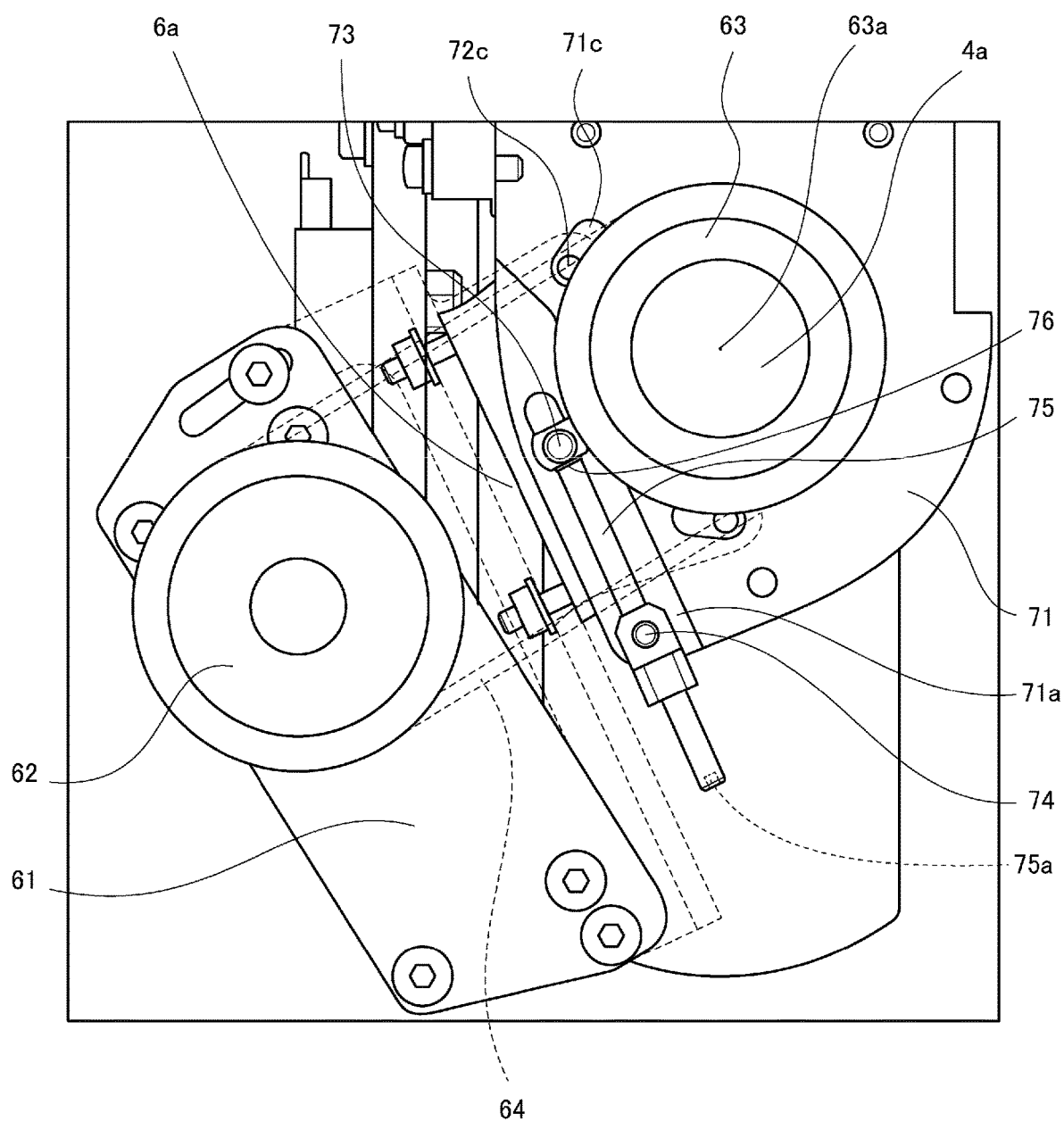
FIG. 3 is an explanatory view showing the manual toe angle adjustment mechanism of the present embodiment from above.

Referring to FIGS. 2 and 3, the manual toe angle adjustment mechanism 7 includes a wheel-side flat surface portion 71 having a first flat surface 71a perpendicular to the steering rotation axis 63a on an upper surface side and provided on the wheel support body 3, and an electric motor-side flat surface portion 72 having a second flat surface 72b facing at least a part of the first flat surface 71a of the wheel-side flat surface portion 71 and fixed to the electric motor unit 61, a first node portion 73 provided between the first flat surface 71a and the second flat surface 72b and rotatably fixed to the electric motor-side flat surface portion 72, and a second node portion 74 provided on the first flat surface 71a and rotatably fixed to the wheel-side flat surface portion 71. In the present embodiment, the first node portion 73 corresponds to a fixed portion of the present invention, and the second node portion 74 corresponds to a movable portion of the present invention. Both the first node portion 73 and the second node portion 74 are each provided so as to be rotatable around an axis parallel to the steering rotation axis 63a.

The first node portion 73 has a first through hole 73a extending parallel to the first flat surface 71a and the second flat surface 72b. An adjustment screw 75 as an adjustment portion is inserted into the first through hole 73a. The adjustment screw 75 includes a bolt head and an annular groove for fitting an E-ring 76, and the adjustment screw 75 is fixed to the first node portion 73 by sandwiching the first node portion 73 between the bolt head and the E-ring 76 fitted in the annular groove.

The second node portion 74 has a second screw hole 74a extending parallel to the first flat surface 71a. The adjustment screw 75 is screwed into the second screw hole 74a. The second node portion 74 is sandwiched and rotatably fixed between the first flat surface 71a and a cover (not shown) provided on the wheel-side flat surface portion 71 so as to cover the driven pulley 63. In the present embodiment, the steering main body mechanism 6 and the manual toe angle adjustment mechanism 7 configure a steering unit 5.

Figure 4:
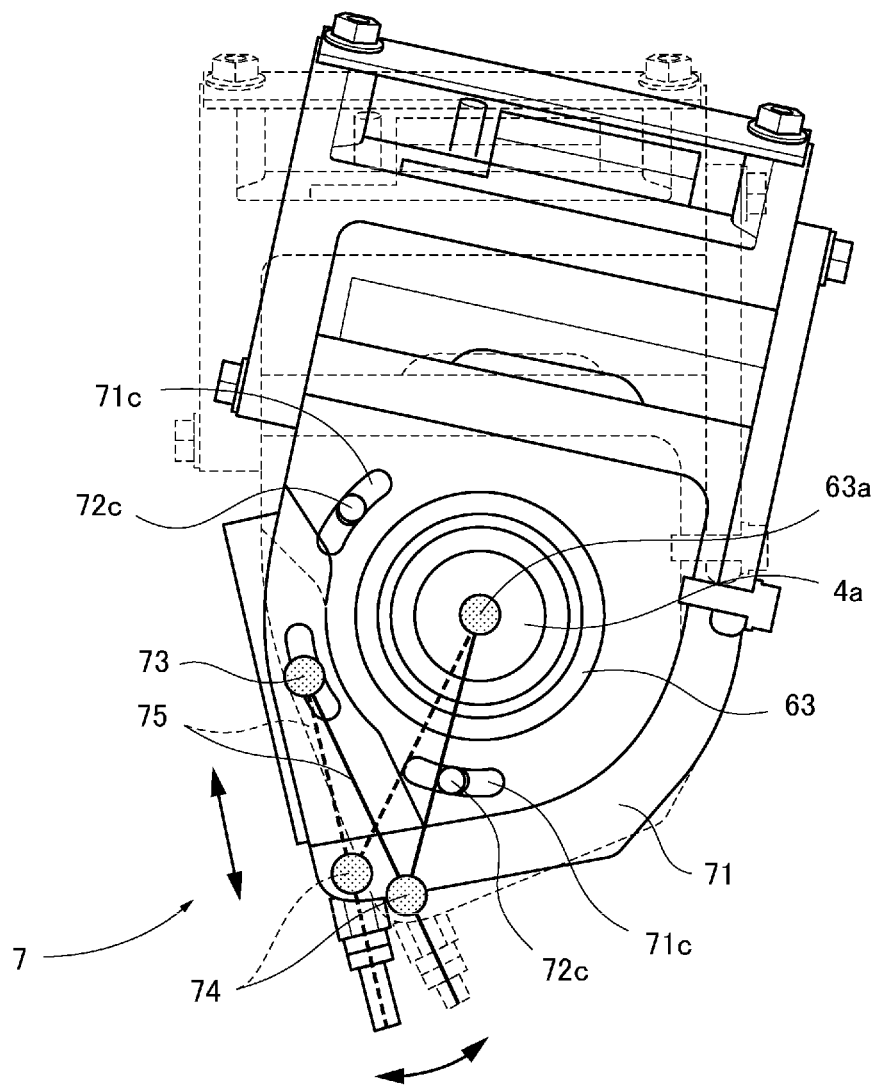
FIG. 4 is an explanatory view showing a state where adjustment is performed with the manual toe angle adjustment mechanism of the present embodiment.

When a toe angle is adjusted with the manual toe angle adjustment mechanism 7, in a state where the electric motor unit 61 is energized and the electric motor unit 61 is controlled not to rotate (in other words, in a state where the electric motor unit 61 and the vehicle body mounting portion 4 do not rotate relative to each other), a hexagonal wrench is inserted into a hexagonal hole 75a provided at a tip of the adjustment screw 75, and the adjustment screw 75 is rotated, by which a distance between the first node portion 73 and the second node portion 74 is changed as shown in FIG. 4. As a result, the wheel-side flat surface portion 71 provided on the wheel support body 3 and the electric motor-side flat surface portion 72 fixed to the electric motor unit 61 rotate relatively, and the toe angle of the wheel 2 with respect to the vehicle body can be adjusted.

Moreover, the first node portion 73 is disposed in a space between the electric motor unit 61 and the wheel support body 3 inside the belt 64 in plan view. As a result, a dead space between the electric motor unit 61 and the wheel support body 3 can be effectively used, and the steering apparatus 1 can be downsized.

Moreover, the second node portion 74 is disposed outside the belt 64 in plan view. As a result, the hexagonal wrench (not shown) can be easily inserted into the hexagonal hole 75a at the tip of the adjustment screw 75, and the toe angle adjustment work can be more easily performed as compared with a case where the hexagonal wrench needs to be inserted into the space inside the belt 64.

Note that the wheel-side flat surface portion 71 is provided with a long hole 71c having a circular arc shape centering on the steering rotation axis 63a. A bolt 72c inserted into the long hole 71c is screwed to the electric motor-side flat surface portion 72. Normally, the wheel-side flat surface portion 71 and the electric motor-side flat surface portion 72 are firmly fixed by fastening the bolt 72c, but when the toe angle of the wheel 2 is adjusted, by loosening the bolt 72c, the wheel-side flat surface portion 71 and the electric motor-side flat surface portion 72 are made relatively rotatable with respect to each other. The bolt 72c and the long hole 71c prevent excessive relative rotation between the wheel-side flat surface portion 71 and the electric motor-side flat surface portion 72.

According to the steering apparatus 1 of the present embodiment, it is not necessary to perform fine adjustment of a zero position of the electric motor unit 61 or fine adjustment by loosening a mounting point of the electric motor unit 61, and the toe angle can be manually adjusted with the manual toe angle adjustment mechanism 7. Note that, even if positions of the first node portion 73 and the second node portion 74 are interchanged, and the second node portion 74 as the movable portion is disposed inside the belt 64, and the first node portion 73 as the fixed portion is disposed outside the belt 64, operation and effects of the present invention can be similarly obtained. In the present embodiment, a structure in which the rotation of the electric motor unit 61 is transmitted via the pulleys 62, 63 and the belt 64 is adopted, but another power transmission mechanism may be used. For example, a rotational force of the electric motor can also be transmitted using a gear train. In addition, in the present embodiment, it is necessary to loosen the bolt 72c when the toe angle of the wheel 2 is adjusted, but the toe angle can be adjusted more accurately and easily than fine adjustment by loosening a fixed portion of the vehicle body mounting portion 4 or the electric motor unit 61.

FIG. 5 is an enlarged view of a manual toe angle adjustment mechanism 7 of a steering apparatus 1 according to another embodiment of the present invention. The steering apparatus 1 of the other embodiment shown in FIG. 5 has the same configuration as the steering apparatus 1 shown in FIG. 1 except that the manual toe angle adjustment mechanism 7 is different from that of the steering apparatus 1 shown in FIG. 1, and the same reference signs are given to the steering apparatus 1 and description thereof is omitted.

The manual toe angle adjustment mechanism 7 of the other embodiment shown in FIG. 5 is connected by a first ball joint 77 fixed to the electric motor unit 61, a second ball joint 78 fixed to the wheel-side flat surface portion 71, and an adjustment screw 75 connecting the first ball joint 77 and the second ball joint 78.

Both ends of the adjustment screw 75 in FIG. 5 are configured of a regular screw portion (not shown) and a reverse screw portion (not shown), and the regular screw portion (not shown) is screwed into a regular screw hole (not shown) provided in the first ball joint 77, and the reverse screw portion (not shown) is screwed into a reverse screw hole (not shown) provided in the second ball joint 78. When a spanner (not shown) is fitted to a spanner fitting portion 75b provided in a center of the adjustment screw 75, and the adjustment screw 75 is rotated in one direction, a distance is shortened, and when the adjustment screw 75 is rotated in another side, the distance is extended. As a result, in the other embodiment shown in FIG. 5, the toe angle can also be easily adjusted similarly to the steering apparatus 1 of the embodiment of FIG. 1.

Note that also in the embodiment of FIG. 5, the first ball joint 77 or the second ball joint 78 may be disposed inside a belt 64. In this case, when the spanner fitting portion 75b is located outside the belt 64 in plan view, the adjustment screw 75 can be easily rotated.

REFERENCE SIGNS LIST

1 steering apparatus
2 wheel
3 wheel support body
4 vehicle body mounting portion
4a steering rotating shaft
5 steering unit
6 steering main body mechanism
6a existing region
61 electric motor unit
62 driving pulley
63 driven pulley
63a steering rotation axis
64 belt
65 control portion
7 manual toe angle adjustment mechanism
71 wheel-side flat surface portion
71a first flat surface
71c long hole
72 electric motor-side flat surface portion
72b second flat surface
72c bolt
73 first node portion
73a first through hole
74 second node portion
74a second screw hole
75 adjustment screw
75a hexagonal hole
75b spanner fitting portion
76 E-ring
77 first ball joint
78 second ball joint

What is claimed is:
1. A steering apparatus comprising:
a wheel;
a steering unit configured to steer the wheel, the steering apparatus being fixable to a vehicle body;
a vehicle body mounting portion fixed to the vehicle body; and
a wheel support portion configured to rotatably support the wheel,
wherein:
the steering unit is rotatable with respect to the vehicle body mounting portion, and connects the vehicle body mounting portion and the wheel support portion so as to rotate integrally with the wheel support portion,
the steering unit includes:
a steering drive source configured to steer the wheel with a steering rotation axis as an axis, the steering rotation axis being a rotation axis when the wheel is steered; and
a manual toe angle adjustment mechanism different from the steering drive source, the manual toe angle adjustment mechanism enabling a toe angle of the wheel to be manually adjusted around the steering rotation axis;
the manual toe angle adjustment mechanism includes:

a fixed portion provided on the steering unit so as to be rotatable around an axis parallel to the steering rotation axis;

a movable portion provided on the wheel support portion so as to be rotatable around an axis parallel to the steering rotation axis; and an adjustment portion configured to connect the fixed portion and the movable portion such that a distance between the fixed portion and the movable portion is adjustable, and the adjustment portion enables the distance between the fixed portion and the movable portion to be adjusted, and enables the toe angle of the wheel to be adjusted by adjusting the distance.

2. The steering apparatus according to claim 1, wherein an electric motor is disposed at a position eccentric to a steering rotating shaft centering on the steering rotation axis, the adjustment portion is provided with an operation portion configured to operate the adjustment portion, and the operation portion is disposed outside an existing region where a power transmission mechanism between the electric motor and the steering rotating shaft exists.

3. The steering apparatus according to claim 2, wherein any one of the fixed portion and the movable portion is disposed so as to be included in the existing region, another one of the fixed portion and the movable portion is disposed outside the existing region, and the operation portion is provided on a side of the other one of the fixed portion and the movable portion.

* * * * *